(12) United States Patent
Ahmadloo et al.

(10) Patent No.: US 11,124,595 B2
(45) Date of Patent: Sep. 21, 2021

(54) POLYOL BLENDS USEFUL FOR PRODUCING VISCOELASTIC FOAM

(71) Applicant: Dow Global Technologies LLC, Midland, MI (US)

(72) Inventors: Hamideh Ahmadloo, Horgen (CH); Paul Cookson, Schindellegi (CH); Ricco B. Borella, Schindellegi (CH); Jean-Paul Masy, Destelbergen (BE); Lucie Porcelli, Richterswil (CH); Francois Casati, Pfaeffikon (CH)

(73) Assignee: Dow Global Technologies LLC, Midland, MI (US)

( * ) Notice: Subject to any disclaimer, the term of this patent is extended or adjusted under 35 U.S.C. 154(b) by 277 days.

(21) Appl. No.: 16/475,119

(22) PCT Filed: Dec. 19, 2017

(86) PCT No.: PCT/US2017/067434
§ 371 (c)(1),
(2) Date: Jun. 30, 2019

(87) PCT Pub. No.: WO2018/136189
PCT Pub. Date: Jul. 26, 2018

(65) Prior Publication Data
US 2019/0330406 A1   Oct. 31, 2019

Related U.S. Application Data

(60) Provisional application No. 62/447,276, filed on Jan. 17, 2017.

(51) Int. Cl.
| C08G 18/08 | (2006.01) |
| C08G 18/48 | (2006.01) |
| C08G 18/76 | (2006.01) |
| C08G 65/26 | (2006.01) |
| C08L 71/02 | (2006.01) |
| C08L 83/04 | (2006.01) |

(52) U.S. Cl.
CPC ........ *C08G 18/4812* (2013.01); *C08G 18/14* (2013.01); *C08G 18/485* (2013.01); *C08G 18/7621* (2013.01); *C08G 65/2609* (2013.01); *C08L 83/04* (2013.01); *C08G 18/4845* (2013.01); *C08G 2110/0008* (2021.01); *C08G 2110/0041* (2021.01); *C08G 2110/0083* (2021.01)

(58) Field of Classification Search
None
See application file for complete search history.

(56) References Cited

U.S. PATENT DOCUMENTS

| 5,420,170 | A  |   | 5/1995  | Lutter |             |
| 6,491,846 | B1 |   | 12/2002 | Reese, II |           |
| 9,266,996 | B2 | * | 2/2016  | Obi ........ | C08G 18/283 |
| 9,951,174 | B2 | * | 4/2018  | McVey ........ | C08G 18/165 |
| 2004/0087675 | A1 |   | 5/2004 | Yu |             |
| 2004/0266900 | A1 |   | 12/2004 | Neff |           |
| 2007/0299153 | A1 |   | 12/2007 | Hager |          |
| 2011/0034575 | A1 | * | 2/2011 | Triouleyre ......... | C08G 18/4072 521/137 |
| 2011/0105634 | A1 |   | 5/2011 | Cookson |        |
| 2015/0252140 | A1 |   | 9/2015 | Smiecinski |     |

* cited by examiner

*Primary Examiner* — Melissa A Rioja

(57) ABSTRACT

A polyol composition is made by polymerizing a mixture of ethylene oxide and propylene oxide onto a mixture of at least one diol initiator and at least one triol initiator, followed by polymerizing 100% propylene oxide or a mixture of at least 90 weight percent propylene oxide and at most 10 weight percent ethylene oxide. The resulting polyol composition has a hydroxyl equivalent weight of 200 to 400 and an average nominal functionality of 2.05 to 2.95 hydroxyl groups/molecule. 5 to 30 percent of the hydroxyl groups of the coinitiated polyether polyol are primary hydroxyl groups and polymerized ethylene oxide constitutes 40 to 63 percent of the total weight of the coinitiated polyether polyol.

15 Claims, No Drawings

POLYOL BLENDS USEFUL FOR PRODUCING VISCOELASTIC FOAM

This invention relates to polyol compositions useful for making viscoelastic foam, to methods for making the polyol compositions, and to methods for making viscoelastic foam using the compositions.

Viscoelastic (VE) foam represents a fast-growing segment of the polyurethane foam industry. VE foam is characterized by low resiliency values and by slow recovery from compression. These properties distinguish VE foams from HR (High Resiliency) and "conventional" flexible polyurethane foams, which have much greater resiliency and which recover almost immediately after compression. These viscoelastic foams are sometimes marketed as "memory" foam. They are being used increasingly in pillows and mattresses, where the viscoelastic character of the foam imparts a feel that consumers perceive as highly comfortable. They are also used in acoustic applications to reduce NVH (noise, vibration and harshness) and in various applications such as earplugs where slow recovery is advantageous.

Like HR and conventional flexible polyurethane foams, VE foams are made in a reaction of a polyisocyanate with one or more polyalcohol (polyol) compounds and water.

VE foams are notoriously difficult to process at industrial scale. This results from formulation choices that are needed to produce the low resiliency, slow recovery from compression and necessary softness.

A common VE foam formulation includes one or more polyols that have an equivalent weight of about 200 to 400, combined with one or more higher equivalent weight polyols and usually a small amount of water. The mixture of high and low equivalent weight polyols leads to the desired combination of flexibility and low resiliency. Some or all of these polyols are typically made by polymerizing a large amount of ethylene oxide with a small amount of propylene oxide. This produces polyols that are hydrophilic and have mostly primary hydroxyl groups. The primary hydroxyl groups react more vigorously towards isocyanate groups than do secondary hydroxyl groups. The high exotherms produced lead to scorching when large foam buns are produced, despite the small amount of water ordinarily used in VE foam formulations.

The higher molecular weight polyols tend to be poorly compatible with the lower molecular weight polyols. Mixtures of these polyols tend to phase separate upon standing. Therefore, to produce a uniform product, it is necessary to provide separate storage and delivery systems for each of these polyols, so they can be kept separate until they are mixed just before or at the same time as the foam is produced. This introduces extra costs to the process due to the need to ship multiple products and transport and store them separately. Because an additional stream must be metered, there is greater chance for metering errors and resulting variability in the product.

Another problem with using low equivalent weight polyols that contain high proportions of oxyethylene units is that they tend to crystallize or phase separate upon standing.

Another processing difficulty arises because of the small amount of water used in VE foam formulations. The smaller amount of water makes the reaction system susceptible to major processing problems such as long cream times, incomplete expansion, settling, shrinking, bulging or even foam collapse. Cell opening in VE foam formulations can be hard to achieve, again due to the low water levels in the formulation. Whereas HR and conventional flexible foam systems are rather robust, the VE systems are very sensitive to the type of and levels of the surfactant and catalysts, as well as small changes in the reactants themselves and the reaction conditions (especially temperature).

VE foams are usually made at low isocyanate index to reduce crosslink density, promote cell opening and promote foam softness. In low isocyanate index systems, some of the polyisocyanate molecules react with water to form the corresponding polyamines, but there are not enough remaining isocyanate groups present in the system to combine with those polyamines and incorporate them into the polymer network through urea formation. Thus, free aromatic diamines such as toluene diamine or methylene diphenyldiamine tend to form. This represents a loss of raw materials and creates significant odor and exposure risks to workers and end-users problem.

Another problem related to the low water content is the stability of the foaming mixture. It is often necessary to use specialty surfactants to prevent foam collapse. The specialty surfactants are expensive and often contain high amounts of volatile organic compounds (VOCs).

Another problem seen in industrial-scale VE foam production is sagging or bulging. VE foams tend to settle upon cooling from production temperatures because of their low crosslink density. This leads to large density differences within the foam bun and distortions in its shape. When the bun is subsequently cut into sections, the various segments have inconsistent properties. Some segments have densities out of specification and must be scrapped.

This invention in one aspect is a polyol composition comprising A) at least one difunctional polyether having a hydroxyl equivalent weight of 200 to 400 and B) at least one trifunctional polyether having a hydroxyl equivalent weight of 200 to 400, the at least one difunctional polyether and at least one trifunctional polyether each including a) the residue, after removal of hydroxyl hydrogen atoms, of a starter, b) oxypropylene units and c) oxyethylene units, wherein components A) and B) together have an average nominal functionality of 2.05 to 2.95, the combined weight of the oxyethylene units of components A) and B) constitutes 40 to 63% of the combined weight of components A) and B), the combined weight of the residues of the starters, oxypropylene units and oxyethylene units of components A) and B) constitute at least 90% of the combined weight of components A) and B), and 5 to 30 percent of the total number of hydroxyl groups of components A) and B) are primary hydroxyl groups.

The invention is also a coinitiated polyether polyol composition produced by polymerizing a mixture of 50 to 80 weight percent ethylene oxide and correspondingly 20 to 50 weight percent of propylene oxide onto a mixture of at least one diol initiator having a molecular weight of at most 150 and at least one triol initiator having molecular weight of at most 150 to form an intermediate polyether mixture that includes at least one difunctional, random copolymer of ethylene oxide and propylene oxide and at least one trifunctional, random copolymer of ethylene oxide and propylene oxide, and then polymerizing 100% propylene oxide or a mixture of at least 90 weight percent propylene oxide and at most 10 weight percent ethylene oxide onto the intermediate polyether mixture to produce the coinitiated polyether polyol mixture, the coinitiated polyether polyol mixture having a hydroxyl equivalent weight of 200 to 400 and an average nominal functionality of 2.05 to 2.95 hydroxyl groups/molecule, wherein 5 to 30 percent of the hydroxyl groups of the coinitiated polyether polyol are primary hydroxyl groups and polymerized ethylene oxide constitutes 40 to 63 percent of the total weight of the coinitiated polyether polyol.

The invention is also a method for making a coinitiated polyether polyol composition, comprising polymerizing a mixture of 50 to 80 weight percent ethylene oxide and correspondingly 20 to 50 weight percent of propylene oxide onto a mixture of at least one diol initiator having a molecular weight of at most 150 and at least one triol initiator having molecular weight of at most 150 to form an intermediate polyether mixture that includes at least one difunctional, random copolymer of ethylene oxide and propylene oxide and at least one trifunctional, random copolymer of ethylene oxide and propylene oxide, and then polymerizing 100% propylene oxide or a mixture of at least 90 weight percent propylene oxide and at most 10 weight percent ethylene oxide onto the intermediate polyether mixture to produce the coinitiated polyether polyol mixture, the coinitiated polyether polyol mixture having a hydroxyl equivalent weight of 200 to 400 and an average nominal functionality of 2.05 to 2.95 hydroxyl groups/molecule, wherein 5 to 30 percent of the hydroxyl groups of the coinitiated polyether polyol are primary hydroxyl groups and polymerized ethylene oxide constitutes 40 to 63 percent of the total weight of the coinitiated polyether polyol.

The difunctional and trifunctional components (components A) and B), respectively) of the polyether polyol composition of the invention are resistant to crystallization and are compatible with each other at room temperature. Therefore, the polyol composition can be stored without applied heating for prolonged time periods without partially or entirely solidifying or separating. When the oxyethylene content of components A) and B) of the polyol composition is 63 weight percent or lower (based on the combined weights of components A) and B)), the polyol composition resists crystallization and phase separation when stored at temperatures of 5° C. or even lower.

The polyether polyol composition is useful for making VE foam. It can be used by itself or in combination with one or more other isocyanate-reactive materials to make such a foam. The polyether polyol composition offers several important advantages in VE foam production. It provides a soft, low resiliency foam even when produced at an isocyanate index of 90 or greater.

The ability to use such a high isocyanate index leads to a reduction in the amount of aromatic amines that are produced. It is also possible, with the polyol composition of the invention, to omit crosslinkers and/or chain extenders, or to minimize the amounts thereof that are needed to produce good quality foam. The foams do not require specialty surfactants that have high VOC levels. Low odor foams result, and workers and end-users are exposed to lower levels of VOCs.

The polyether polyol composition also leads to lower exotherms, thus reducing scorch, and to reduced amounts of sagging or bulging in the foam. These attributes contribute to low scrap rates and better and more uniform VE foam quality.

Therefore, the invention in a further aspect is a process for making a viscoelastic foam, comprising combining at least one organic polyisocyanate with water and a polyol composition of the first or second aspect of the invention at an isocyanate index of 60 to 150 to form a reaction mixture and curing the reaction mixture to form a polyurethane-urea foam having a foam density of 30 to 120 kg/m$^3$.

The invention is also a VE foam made in the foregoing process.

The at least one difunctional polyether (component A)) and the at least one trifunctional polyether (component B)) each may have a hydroxyl equivalent weight of at least 205, at least 215 or at least 220, up to 350, up to 300, up to 275 or up to 250. Likewise, the hydroxyl equivalent weight of the polyol composition may be at least 200, at least 215, at least 220, and up to 400, up to 300, up to 275 or up to 250.

The average nominal functionality (number of hydroxyl groups per molecule) of the at least one difunctional polyether and the at least one trifunctional polyether (components A) and B)) may be in some embodiments at least 2.2, at least 2.3 or at least 2.4 and may be up to 2.8, up to 2.7 or up to 2.6. The average functionality of components A) and B) of the polyol composition is calculated from the functionalities of the difunctional and trifunctional starters used to prepare components A) and B), respectively, as follows:

Average nominal functionality=

$$\frac{(2 \times moles_{diol\ starters}) + (3 \times moles_{triol\ starters})}{moles_{diol\ starters} + moles_{triol\ starters}}$$

In some embodiments, at least 10%, at least 13% or at least 16% of the hydroxyl groups of components A) and B) are primary hydroxyls, as determined by nuclear magnetic resonance (NMR). In some embodiments, at most 30%, at most 25% or at most 20% of the hydroxyl groups of components A) and B) are primary hydroxyls, as determined by NMR. These percentages apply with respect to the mixture of components A) and B). Preferably, the percentage of hydroxyl groups of each of components A) and B) individually also falls within these ranges.

The combined weight of oxyethylene units (residues of the polymerization of ethylene oxide) of components A) and B) constitutes in some embodiments at least 48%, at least 50% or at least 52% of the combined weights of components A) and B), and in some embodiments constitutes up to 60% of the combined weights of components A) and B).

The combined weight of oxypropylene units (residues of the polymerization of propylene oxide) of components A) and B) constitutes in some embodiments at least 25%, at least 30% or at least 32%, and up to 45%, up to 40% or up to 38% of the combined weights of components A) and B).

The combined weight of the residues of the starters used to make components A) and B) constitutes in some embodiments at least 7%, at least 10%, at least 12% or at least 14% and up to 25%, up to 20% or up to 18% of the combined weight of components A) and B).

Oxyethylene units, oxypropylene units and the residues of the starters constitute at least 90% of the combined weight of components A) and B). Components A) and/or B) may contain other copolymerized monomers, provided that those other copolymerized monomers constitute no more than 10% of the combined weight of components A) and B) of the polyol composition. It is preferred that such other copolymerized monomers constitute no more than 5% or no more than 1% of the combined weight of components A) and B) of the polyol composition. It is most preferred that at least 95%, at least 99% or even 100% the combined weight of components A) and B) of the polyol composition is made up oxyethylene units, oxypropylene units and the residues of the starters.

The mixture of components A and B is conveniently made by polymerizing ethylene oxide and alkylene oxide in the presence of a starter mixture that includes at least difunctional starter (the diol starter) and at least one trifunctional starter (the triol starter). Other, copolymerizable monomers may be polymerized as well, provided that those other copolymerized monomers constitute no more than 10% of the combined weight of components A) and B) of the polyol composition The diol starter is a compound that has exactly two hydroxyl groups and a molecular weight of up to 150, or a mixture of two or more such compounds. The molecular weight of the diol starter may be, for example, 62 to 150, 62 to 125, 62 to 100 or 62 to 90. Examples of diol starters include water, ethylene glycol, 1,2-propylene glycol, 1,3-propylene glycol, 1,4-butane diol, diethylene glycol, thiodiethanol, N-methyldiethanolamine and dipropylene glycol.

The triol starter is a compound that has exactly three hydroxyl groups and a molecular weight of up to 150, or a mixture of such compounds. The molecular weight of the triol starter may be, for example 90 to 150. Examples of triol starters include glycerin, trimethylolpropane and triethanolamine.

The diol and triol starters are provided in relative amounts sufficient to provide the polyether composition with an average nominal functionality as described before.

The amount of ethylene oxide polymerized in the presence of the starter mixture is sufficient to provide the mixture of components A) and B) of the polyol composition with an oxyethylene content as described before. Similarly, the amounts of ethylene oxide and propylene oxide polymerized in the presence of the starter mixture are sufficient to provide the mixture of components A) and B) of the polyol composition with oxyethylene and oxypropylene contents as described before.

Because ethylene oxide forms a terminal primary hydroxyl group when it adds onto the end of a polymer chain, and propylene oxide forms mainly terminal secondary hydroxyl groups, the polymerization process preferably is performed in such a manner that mostly propylene oxide polymerizes at the end of the polymerization reaction. A useful way of accomplishing this is to polymerize propylene oxide by itself, or a mixture that contains mainly propylene oxide, at the end of the polymerization process to achieve a primary hydroxyl content as described above.

Thus, in some embodiments, a mixture of 50 to 80 weight percent ethylene oxide and correspondingly 20 to 50 weight percent of propylene oxide is polymerized in a first onto the mixture of diol and triol starters. This forms an intermediate polyether mixture that includes at least one difunctional, random copolymer of ethylene oxide and propylene oxide and at least one trifunctional, random copolymer of ethylene oxide and propylene oxide. Because this alkylene oxide mixture is rich in ethylene oxide, this intermediate typically contains a high proportion of primary hydroxyl groups. Subsequently propylene oxide by itself or a mixture of at least 90 weight percent propylene oxide and at most 10 weight percent ethylene oxide is polymerized onto the intermediate polyether mixture to produce the polyol composition that contains components A) and B) as described before. This polymerization of mainly propylene oxide onto the ends of the polymer chains produces a product that contains mostly secondary hydroxyl groups and a small proportion of primary hydroxyl groups, as described above.

If desired, one or more other starter compounds that have one hydroxyl group per molecule or 4 or more hydroxyl groups per molecule may be present during the polymerization process. In such a case, such additional starters preferably constitute at most 20 percent and preferably at most 10 percent or 5 percent of the total weight of all starters. When such an additional starter is present, the resulting polyol composition will include at least one other polyether in addition to components A and B.

The polymerization of alkylene oxides onto hydroxyl-containing starter compounds is well known. No special polymerization conditions are needed, and therefore such known polymerization methods are entirely suitable. The polymerization is generally preferred at superatmospheric pressures and an elevated temperature such as, for example, 60 to 200° C., especially 90 to 160° C. or 120 to 150° C.

The polymerization is generally performed in the presence of an alkylene oxide polymerization catalyst. Strong bases such as alkali metal hydroxides, alkali metal alkoxides, certain tertiary amines, phosphonium compounds and the like are useful. In addition, various organometallic compounds such as alkaline earth carbonates/aluminum isopropoxide-zinc chloride catalyst systems, alkyl aluminum-water-acetylacetonate systems, diethyl zinc-aluminum oxide systems, bimetallic oxido-alkoxide catalysts and the so-called double metal cyanide catalyst complexes (preferably those including zinc hexacyanocobaltate) are also useful. A preferred catalyst is an alkylene oxide, especially potassium hydroxide, as these are inexpensive and provide fast polymerization rates. Because the equivalent weight of the product is low and a high proportion of ethylene oxide is polymerized, little isomerization of propylene oxide occurs during the polymerization, and the actual functionality of the product is close to the nominal functionality, even when alkali metal hydroxide polymerization catalysts are used.

After the polymerization is completed, the product may be purified if desired by, for example, removing unreacted monomers and reaction by-products if any, and/or by neutralizing and/or removing catalyst residues. The pH of the product may be adjusted if desired. One or more antioxidants, biocides or other preservative may be added to the product if desired. Among the useful antioxidants are phenolic or aromatic amine compounds linked together with C5 to C20 carbon chains as are commercially available under the trade names Irganox®, Vanlube® and Vanox®.

The polyol composition of the invention may contain one or more other polyols in addition to components A and B. These additional polyols can be manufactured separately and blended with components A and B, and/or made simultaneously with components A and B by performing the polymerization in the presence of one or more additional starters, as described before. Components A and B together may constitute, for example, at least 20%, at least 33%, at least 40%, at least 50%, at least 60%, at least 65%, at least 70%, at least 80% or at least 90% of the total weight of all polyols in the polyol composition. Components A and B together may constitute 100% of the weight of the polyol composition.

The polyol composition of the invention is useful for making viscoelastic (VE) foam.

VE foam is made in accordance with the invention by reaction of a foam formulation that includes at least one polyisocyanate, the polyol composition of the invention and at least one blowing agent.

Components A) and B) of the polyol composition together may constitute, for example at least 20%, at least 33%, at least 40%, at least 50%, at least 60%, at least 65%, at least 75% or at least 85% of the total weight of all isocyanate-reactive compounds (including water, when present) in the foam formulation. Components A) and B) together may constitute up to 99.5%, up to 99%, up to 95% or up to 90% of the total weight of those isocyanate-reactive compounds.

Other isocyanate-reactive compounds that may be present include water; one or more chain extenders, one or more crosslinkers, and one or more polyols having an equivalent weight per isocyanate-reactive group of greater than 400. Any or all of these materials may be incorporated into the polyol composition of the invention prior to producing the VE foam.

Water preferably is present and when present constitutes 0.5% to 3.5%, preferably 1% to 2% of the total weight of all isocyanate-reactive materials in the foam formulation. When present, water functions as both a chain extender and a blowing agent.

Chain extenders (other than water) are compounds that react difunctionally with isocyanate groups and have equivalent weights per isocyanate-reactive group of less than 200, preferably 30 to 125. Examples of chain extenders include ethylene glycol, diethylene glycol, triethylene glycol, propylene oxide, dipropylene glycol, tripropylene glycol, 1,4-butanediol, 1,6-hexanediol, ethylene diamine, propylene diamine, and the like. If used, chain extenders (other than water) preferably constitute no more than 5%, no more than 2.5%, no more than 1% or no more than 0.5% of the total weight of all isocyanate-reactive materials in the foam formulation.

Crosslinkers are compounds that have three or more isocyanate-reactive groups and equivalent weights per isocyanate-reactive group of less than 200, preferably 30 to 125. Examples of crosslinkers include glycerin, trimethylolpropane, triethylolpropane, pentaerythritol, erythritol, triethanolamine, diethanolamine, mannitol, sucrose, urea, sorbitol and the like. If used, crosslinkers (other than water) may constitute at least 0.25% of the total weight of all isocyanate-reactive materials in the foam formulation. Crosslinkers preferably constitute no more than 5%, no more than 2.5%, no more than 1% or no more than 0.5% of the total weight of all isocyanate-reactive materials in the foam formulation.

Useful polyols having an equivalent weight per isocyanate-reactive group of greater than 400 include polyether polyols, polyester polyols, amine-terminated polyethers and the like. The equivalent weight may be, for example, at least 500, at least 750, at least 1000, at least 1200 or at least 1500 and may be, for example, up to 4000, up to 3000, up to 2500 or up to 2000. These polyols may have 2 to 8, 2 to 4 or 3 to 4 isocyanate-reactive groups per molecule. Polyether polyols include, for example, homopolymers of propylene oxide and random polymers of at least 70% propylene oxide and up to 30% ethylene oxide. Polyols having an equivalent weight of greater than 400 may constitute up, for example to 50%, up to 40%, up to 30%, up to 25%, up to 20%, up to 15%, up to 10% or up to 5% of the total weight of all isocyanate-reactive materials in the foam formulation.

The polyisocyanate compound used to make the VE foam may have an isocyanate equivalent weight of up to 300, for example. The isocyanate equivalent weight may be up to 250, up to 175, and in some embodiments is 50 to 175. If a mixture of polyisocyanate compounds is used, these equivalent weights apply with respect to the mixture; individual polyisocyanate compounds in such a mixture may have isocyanate equivalent weights above, within or below those ranges.

Examples of useful polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers), methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate.

Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. "Polymeric MDI", which is a mixture of PMDI and MDI, can be used. Toluene-2,4-diisocyanate, toluene-2,6-diisocyanate and mixtures thereof are generically referred to as TDI, and all can be used.

The foam formulation preferably contains one or more catalysts. The catalyst(s) catalyze either or both of the water-isocyanate reaction and the alcohol-isocyanate reaction. Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

A reactive amine catalyst, such as DMEA (dimethylethanolamine) or DMAPA (dimethylaminopropyl amine), or an amine-initiated polyol, acting as an autocatalytic polyol, may also be used to reduce VOC's (volatile organic compounds).

Tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, and the like. Tin carboxylates in which the carboxylate group has 6 to 18 carbon atoms are sometimes associated with lower VOCs in the VE foam. Zinc and tin catalysts are generally used in conjunction with one or more tertiary amine catalysts, if used at all.

Catalysts are typically used in small amounts, each catalyst being employed for example, in an amount of from about 0.0015 to about 5% by weight of polyol(s). Zinc and tin catalysts are generally used in very small amounts within this range, such as from 0.0015 to 0.25 weight-%.

It is highly preferred to include a foam-stabilizing surfactant in the foam formulation. The foam-stabilizing surfactant helps stabilize the gas bubbles formed by the blowing agent during the foaming process until the polymer has cured. A wide variety of silicone surfactants as are commonly used in making polyurethane foams can be used in making the foams with the polymer polyols or dispersions of this invention. Examples of such silicone surfactants are commercially available under the trade names Tegostab™

(Th. Goldschmidt and Co.), Niax™ (GE OSi Silicones) and Dabco™ (Air Products and Chemicals). The surfactant in some embodiments contributes no greater than 350, no greater than 250, no greater than 200 or no greater than 150 ppm of siloxane VOC's to a foam prepared and tested in accordance with Thermal Desorption Method VDA 278 under 90° C., 30 minute conditions. This test is described, for example, by Thurau et al., "Reducing Silicone Surfactant Emissions in Automotive Flexible Molded Foam" (2012), available at http://www.virtualpu.com/uploads/expo_trend_attachments/0-2012-10-08-11:15:25-reducing-silicone-surfactant-emissions-in-automotive-flexible.pdf.

It may be desirable to include an auxiliary blowing agent in the foam formulation. Such auxiliary blowing agents include physical (endothermic) blowing agents such as various low-boiling chlorofluorocarbons, fluorocarbons, hydrocarbons and the like; as well as chemical (exothermic) blowing agents (other than water) that decompose or react under the conditions of the polyurethane-forming reaction. In addition, a gas such as carbon dioxide, air, nitrogen or argon may be used as an auxiliary blowing agent in a frothing process. Carbon dioxide can also be used as a liquid or as a supercritical fluid.

In addition to the foregoing components, the foam formulation may contain various other optional ingredients such as cell openers; fillers such as melamine and calcium carbonate; polymer dispersions such as a polyolefin dispersion, pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; plasticizers, paraffin oil, plant or animal oils or fats, epoxidized vegetable oils and/or animal fats, wax particles, gel particles and the like.

Suitable flame retardants may be solid or liquid. They include, for example, one or more non-halogenated flame retardants and/or one or more halogenated flame retardants. Exemplary flame retardants include melamine or various melamine derivatives, phosphorous compounds that may or may not contain halogens, aluminum-containing compounds that may or may not contain halogens, various nitrogen-containing compounds that may or may not contain halogens, chlorinated compounds, various brominated compounds, expandable graphite, various boron compounds, and polyureas. In some embodiments, the flame retardant is melamine or a melamine derivative and/or one or more halogenated phosphorous compounds.

VE foam is prepared by combining the polyol composition, water and polyisocyanate(s) in the presence of the various optional ingredients (if any) to form a reaction mixture. The water and various polyols that form the polyol mixture all can be mixed together before they are combined with the polyisocyanate. Alternatively, they can be combined with the polyisocyanate individually (i.e., as separate streams), or can be formed into any sub-mixtures that are then combined with the polyisocyanate. Due to the speed of the curing reaction, it is preferred to combine the water and polyols with the polyisocyanate simultaneously or nearly simultaneously (such as within 5 seconds).

The polyisocyanate, water and polyol mixture preferably are combined using a mixhead or other apparatus that creates an intimate mixture of these components (as well as other components in the reaction mixture as described herein).

The isocyanate index may be, for example, 60 to 150. Isocyanate index refers to 100 times the ratio of isocyanate groups to isocyanate-reactive groups provided by the starting materials (i.e., prior to the consumption of any of those groups in the curing reaction that forms the foam.) A preferred isocyanate index is at least 70, at least 80, at least 90 or at least 95, up to 120 up to 110, up to 105 or up to 100. An advantage of this invention is that VE foam is easily processed into good quality foam at isocyanate indices of at least 90 or at least 95.

The reaction mixture is then foamed and cured. The process of this invention requires no special processing conditions; therefore, processing conditions and equipment described in the art for making polyurethane VE foam are entirely suitable. In general, the components of the reaction mixture are combined. In most cases when a catalyst is present, the isocyanate compounds will react spontaneously with water and the polyols even at room temperature (22° C.). If necessary, heat can be applied to the reaction mixture to speed the curing reaction. This can be done by heating some or all of the ingredients prior to combining them, by applying heat to the reaction mixture, or some combination of each. Curing is continued until the reaction mixture has expanded and cured sufficiently to form a stable foam.

In some embodiments, the curing step is performed in a closed mold. In such a process, the reaction mixture is either formed in the mold itself or formed outside the mold and then injected into the mold, where it cures. The expansion of the reaction mixture as it cures is therefore constrained by the internal surfaces of the mold, as are the size and geometry of the molded part.

In other embodiments, the curing step is performed in a free-rise (or slabstock) process. In the free-rise process, the reaction mixture is poured into an open container such that expansion in at least one direction (usually the vertical direction) occurs against the atmosphere or a lightweight surface (such as a film) that provides negligible resistance to the expansion of the foam. In the free-rise process, the reaction mixture expands in at least one direction essentially unconstrained except by its own weight. The free-rise process may be performed by forming the reaction mixture and dispensing it into a trough or onto a conveyor where it expands and cures. The invention is of particular benefit in a continuous free-rise process, in which the reaction mixture is continuously dispensed into a trough or other reaction zone where it rises and expands. It has been found in such cases that the reaction mixture tends to process easily.

The invention offers a significant advantage in the production of foam via a free-rise process. Such a process tends to produce bunstock that has a large cross-sectional area. In conventional VE foam processes, large bunstocks are prone to sagging or bulging, which is due to the foam partially collapsing under its own weight. This deforms the bun and produces density gradients within it. These phenomena lead to high scrap rates. With this invention, sagging and bulging is minimized if not eliminated. As a result, scrap rates are reduced and overall production costs are decreased as a result.

According to an exemplary embodiment, the foam product may be produced under vacuum using variable pressure foaming (VPF) methods.

The cured VE foam is characterized in having a foam density of 30 to 120 kg/m$^3$, preferably 40 to 80 kg/m$^3$ and more preferably 40 to 60 kg/m$^3$, as measured by ISO 3886.

The VE foam preferably has a resiliency of less than 15%, preferably less than 10% and more preferably less than 8%, as measured by ASTM D-3574. The cured foam has a recovery time of, for example at least 0.5 seconds, at least 1 seconds, at least 1.5 seconds, at least 2 seconds, at least 3 seconds, or at least 5 seconds, as measured according to ASTM D6374-08 Test M, modified as described in the examples below, with the time being measured until the recovering foam applies a force of 4.5N against the indenter or, if the foam is too soft to recover enough to apply a force of 4.5N, then the time is measured until the recovering form applies a force of only 1.0N. The recovery time may be 10 seconds or more or even 15 seconds or more. Recovery times to 4.5N will always be greater than recovery times to only 1.0N.

The VE foam may exhibit (before mechanically opening the cells) an airflow of at least 0.67, at least 0.95, at least 1.33 or at least 2.0 liters/minute, measured according to ASTM D-3574. The airflow may be as high as, for example, up to 40, up to 10 or up to 6 liters/minute. The VE foam may be crushed to further increase airflow. Higher airflows are often important to perceived comfort when the foam is used in personal cushioning applications, since air movement through the foam helps to dissipate body heat, which makes the foam feel cooler and more comfortable. Heat retention is a widely-recognized problem with previously VE foam pillows and mattresses; therefore the ability to dissipate heat through greater movement of air through the foam is an important advantage. Open cells are also key for acoustic applications.

The VE foam of the invention may meet one or more FR (Flame Resistance) standards, such as British Standard flammability test (BS 5852—ignition source 5) using a wooden assembly (referred to as a crib) as a source of ignition.

The VE foam of the invention is useful in cushioning applications such as pillows, mattresses, backrests (for bed headboards, seating, etc.), seating cushions, packaging, protective cushioning, and the like. They can be used as or as a component of sound and/or vibration (i.e., NVH) damping measures. They are useful in other applications where slow recovery after foam compression is wanted. In general, the VE foam of the invention can be used in the same applications and in the same manner as conventionally-produced VE foam.

The following examples are provided to illustrate the invention, but are not intended to limit the scope thereof. All parts and percentages are by weight unless otherwise indicated.

PRODUCTION OF POLYOL COMPOSITION EXAMPLE 1 AND COMPARATIVE POLYOL COMPOSITION A

Polyol Composition Example 1 is made by charging 68 kg of glycerin and 2.5 kg of a 45% aqueous solution of potassium hydroxide into a stainless steel reactor. The water is flashed at 110° C. and 37.4 kg of monopropylene glycol is added. The resulting initiator mixture is heated to 130° C. and at this temperature 412.5 kg ethylene oxide and 157.5 kg of propylene oxide are fed simultaneously to the reactor. After the mixture of alkylene oxides has polymerized, another 74.3 kg of propylene oxide is added at the same temperature and polymerized. The product is treated with magnesium silicate and filtered. The resulting Example 1 has a nominal average functionality of 2.6, a hydroxyl equivalent weight of 237, and contains about 56.5% by weight polymerized ethylene oxide. 18.5% of the hydroxyl groups are primary as measured by NMR. Polyol Composition Example 1 is a liquid at room temperature, and remains liquid and does not phase separate even when stored at 5° C. for 12 days.

Comparative Polyol Composition A is made by charging 68 kg of glycerin and 2.5 kg of a 45% aqueous solution of potassium hydroxide into a stainless steel reactor. The water is flashed at 110° C. and 37.4 kg of monopropylene glycol is added. The resulting initiator mixture is heated to 130° C. and at this temperature 450 kg ethylene oxide and 157 kg of propylene oxide are fed simultaneously to the reactor. After the mixture of alkylene oxides has polymerized, another 37.1 kg of propylene oxide is added at the same temperature and polymerized. The product is treated with magnesium silicate and filtered. The resulting Comparative Polyol Composition A has a nominal average functionality of 2.6, a hydroxyl equivalent weight of 236, and contains about 61.6% by weight polymerized ethylene oxide. 32.6% of the hydroxyl groups are primary as measured by NMR. Comparative Polyol Composition A is a liquid at room temperature, but crystallizes and phase separates when stored overnight at 5° C. This polyol composition cannot be transported and stored without temperature control, and thus is poorly suited for industrial use.

Production of Ve Foams from Polyol Composition Example 1

Viscoelastic foams 1-1 through 1-5 are made in a free-rise foaming processing using developmental scale foaming equipment. The various ingredients are brought to a mix head at room temperature, mixed, dispensed onto a moving conveyor equipped with side walls and covered with paper and allowed to rise and cure without applied heating. The resulting foams are cooled and aged at 20° C. and 50% relative humidity before being evaluated. The foams each are cut open and visually inspected for indications of scorch and sagging. Samples are taken and tested for airflow according to ASTM D-3574, foam density (ISO 3886), compression force depression (at 40% deflection) (ASTM D-3754), resilience (ASTM D-3574) and recovery time (ASTM D6374-08 Test M, modified as described before).

The ingredients used to make these foams are as follows:
TDI is a toluene diisocyanate (TDI) mixture of 80% 2,4-TDI and 20% 2,6 TDI.

Polyol A is a nominally trifunctional random copolymer of propylene oxide and ethylene oxide containing mainly secondary hydroxyl groups and having a hydroxyl number of 48 (corresponding to an equivalent weight of 1169).

The Crosslinker is a complex of urea and sorbitol in water, sold as Orgetol® 204 by Evonik.

Surfactant A is a silicone surfactant sold as Tegostab® 8040 by Evonik.

Surfactant B is a silicone surfactant sold as Tegostab® B2370 by Evonik

Catalyst A is a 70% solution of bis(2-dimethylaminoethyl)ether, sold as Niax® A1 by Momentive Performance Materials.

Catalyst B is a 33% solution of triethylene diamine in dipropylene glycol.

Catalyst C is a zinc catalyst sold as Kosmos™ 54 by Evonik

TABLE 1

| Ingredient | Parts By Weight | | | | |
|---|---|---|---|---|---|
| | Ex. 1-1 | Ex. 1-2 | Ex. 1-3 | Ex. 1-4 | Ex. 1-5 |
| Sample Designation | | | | | |
| Polyol Composition Example 1 | 80 | 80 | 80 | 80 | 80 |

TABLE 1-continued

| Ingredient | Parts By Weight | | | | |
| --- | --- | --- | --- | --- | --- |
| | Ex. 1-1 | Ex. 1-2 | Ex. 1-3 | Ex. 1-4 | Ex. 1-5 |
| Polyol A | 20 | 20 | 20 | 20 | 20 |
| Crosslinker | 1 | 1 | 1 | 1 | 1 |
| Water | 1.37 | 1.37 | 1.37 | 1.37 | 1.07 |
| Surfactant (Type/Amount) | A/0.9 | A/0.9 | B/1.2 | B/1.2 | B/1.2 |
| Catalyst A | 0.25 | 0.25 | 0.25 | 0.25 | 0.3 |
| Catalyst B | 0.1 | 0.1 | 0.1 | 0.1 | 0.1 |
| Catalyst C | 0.25 | 0.2 | 0.25 | 0.25 | 0.2 |
| TDI (Amount/Index) | 45.5/95 | 45.5/95 | 45.5/95 | 47/99 | 42.8/95 |
| Properties | | | | | |
| Airflow (L/s) | 3.5 | 3.0 | 3.7 | 5. | 4 |
| Density (kg/m³) | 50 | 47.3/45.9/46 | 48 | 47.5 | 55 |
| Hardness (kPa) | 1.4 | 1.1 | 1.2 | 1.7 | 1.8 |
| Resilience (%) | 2 | 2 | 2 | 2 | 2 |
| Recovery time, s | 0.7 | 1.1 | 1.2 | 0.9 | 1.4 |

Despite the variations in catalyst package, surfactant, isocyanate index and water content across this range of examples, each of the foam formulations process easily and consistency. None of the foam samples exhibits any evidence of sagging or scorch. The absence of sagging is further borne out by the density measurements for Example 1-2, which represent measurements at the top, middle and bottom of the bun. The small variation in density demonstrates the absence of sagging.

In each of Examples 1-1 through 1-5, an open cell structure is indicated by the high airflow values. Notably, the open cell structure is obtained despite the absence of a cell opener in these formulations. Also notable are the pronounced viscoelastic properties (very low resilience and slow recovery times), which are obtained even though the isocyanate index is close to 100 in each case.

What is claimed is:

1. A polyol composition comprising A) at least one difunctional polyether having a hydroxyl equivalent weight of 200 to 400 and B) at least one trifunctional polyether having a hydroxyl equivalent weight of 200 to 400, the at least one difunctional polyether and at least one trifunctional polyether each including a) a residue, after removal of hydroxyl hydrogen atoms, of a starter, b) oxypropylene units and c) oxyethylene units, wherein components A) and B) together have an average nominal functionality of 2.05 to 2.95, the combined weight of all oxyethylene units of components A) and B) constitutes 40 to 63% of the combined weight of components A) and B), the combined weight of all residues of the starters, oxypropylene units and oxyethylene units of components A) and B) constitute at least 90% of the combined weight of components A) and B), and 5 to 30 percent of the total number of hydroxyl groups of components A) and B) are primary hydroxyl groups.

2. The polyol composition of claim 1 wherein the combined weight of all oxyethylene units of components A) and B) constitutes 48 to 60% of the combined weight of components A) and B).

3. The polyol composition of claim 1 wherein the combined weight of all oxyethylene units of components A) and B) constitutes 52 to 60% of the combined weight of components A) and B).

4. The polyol composition of claim 3 wherein 13 to 25 percent of the total number of hydroxyl groups of components A) and B) are primary hydroxyl groups.

5. The polyol composition of claim 3 wherein 16 to 20 percent of the total number of hydroxyl groups of components A) and B) are primary hydroxyl groups.

6. The polyol composition of claim 3 wherein components A) and B) have an average nominal functionality of 2.3 to 2.7.

7. A polyol composition produced by polymerizing a mixture of 50 to 80 weight percent ethylene oxide and 20 to 50 of propylene oxide onto a mixture of at least one diol initiator having a molecular weight of at most 150 and at least one triol initiator having molecular weight of at most 150 to form an intermediate polyether mixture that includes at least one difunctional, random copolymer of ethylene oxide and propylene oxide and at least one trifunctional, random copolymer of ethylene oxide and propylene oxide, and then polymerizing 100% propylene oxide or a mixture of at least 90 weight percent propylene oxide and at most 10 weight percent ethylene oxide onto the intermediate polyether mixture to produce a coinitiated polyether polyol mixture, the coinitiated polyether polyol mixture having a hydroxyl equivalent weight of 200 to 400 and an average nominal functionality of 2.05 to 2.95 hydroxyl groups/molecule, wherein 5 to 30 percent of the hydroxyl groups of the coinitiated polyether polyol mixture are primary hydroxyl groups and polymerized ethylene oxide constitutes 40 to 63 percent of the total weight of the coinitiated polyether polyol mixture.

8. The polyol composition of claim 7 wherein the combined weight of the oxyethylene units constitutes 48 to 60% of the coinitiated polyether polyol mixture.

9. The polyol composition of claim 7 wherein the combined weight of the oxyethylene units constitutes 52 to 60% of the weight of the coinitiated polyether polyol mixture.

10. The polyol composition of claim 9 wherein 13 to 25 percent of the hydroxyl groups in the coinitiated polyether polyol mixture are primary hydroxyl groups.

11. The polyol composition of claim 9 wherein 16 to 20 percent of the hydroxyl groups in the coinitiated polyether polyol mixture are primary hydroxyl groups.

12. The polyol composition of claim 9 which has an average nominal functionality of 2.3 to 2.7.

13. A viscoelastic foam made by reacting a polyisocyanate at an isocyanate index of at least 70 with a mixture of isocyanate-reactive compounds that includes a polyol composition of claim 1 and water in an amount of 0.5 to 5% of the total weight of the mixture of isocyanate-reactive compounds, in the presence of at least one foam-stabilizing silicone surfactant and at least one catalyst for a water-isocyanate or alcohol-isocyanate reaction.

14. The foam of claim 13, wherein the isocyanate index is 70 to 100.

15. The foam of claim 14, wherein the mixture of isocyanate-reactive compounds contains no more than 0.5% by weight of a crosslinker and no more than 0.5% by weight of a chain-extender.

* * * * *